March 31, 1964   J. TALAMONTI   3,127,183
ANNULAR CARTRIDGE FLUID SEAL DEVICE
Filed March 12, 1959   2 Sheets-Sheet 1
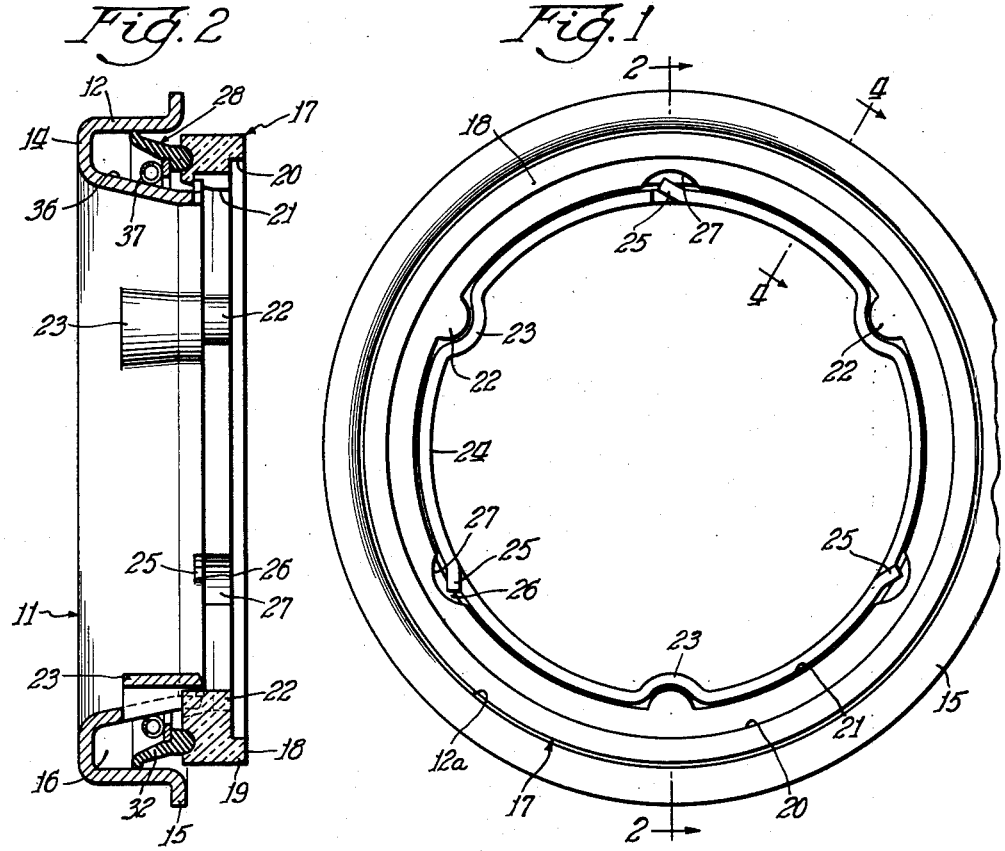
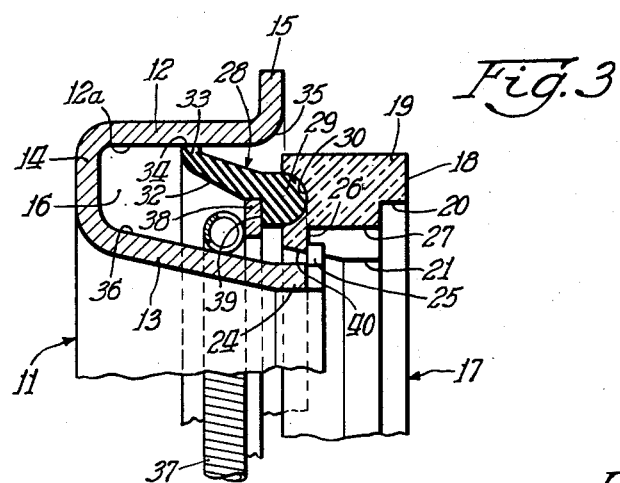
Inventor:
John Talamonti
By: Jones, Dasho & Robertson
Attys.

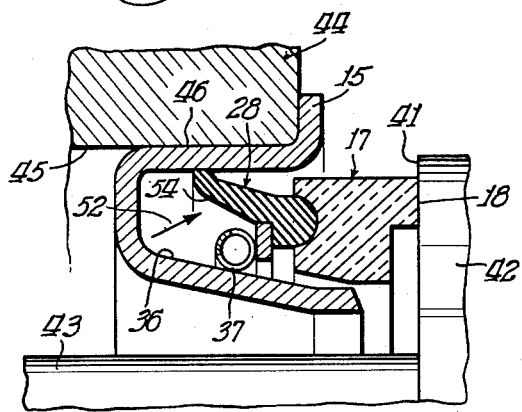
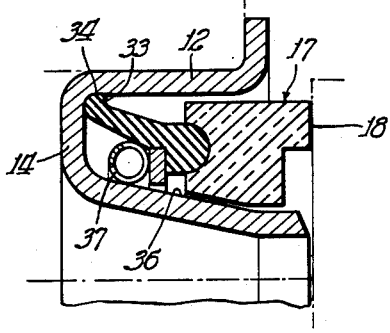
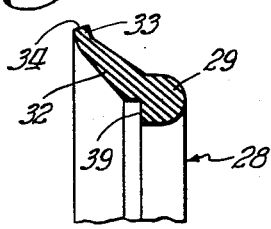
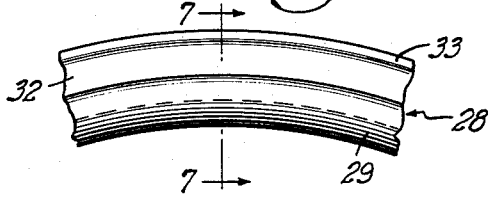
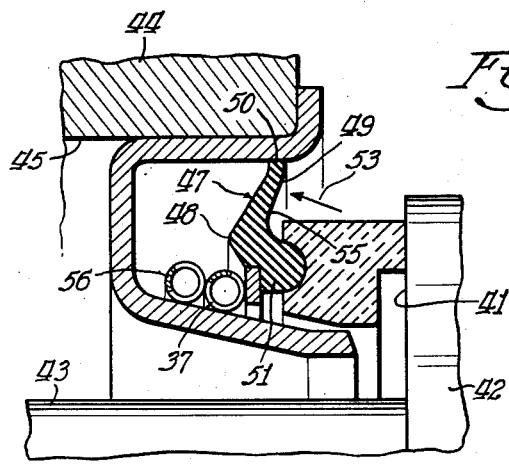

United States Patent Office 3,127,183
Patented Mar. 31, 1964

3,127,183
ANNULAR CARTRIDGE FLUID SEAL DEVICE
John Talamonti, Chicago Heights, Ill., assignor, by mesne assignments, to Borg-Warner Corporation, Chicago, Ill., a corporation of Illinois
Filed Mar. 12, 1959, Ser. No. 798,880
3 Claims. (Cl. 277—40)

This invention relates to annular fluid seal device more particularly of the cartridge, face seal, type and having particular utility for use in automotive transmission units, as an oil seal therefor between a rotary shaft and its housing parts. It may be useful for all forms of water or grease seals.

This application is a continuation in part of my prior application Serial No. 772,791 filed November 10, 1958, and now abandoned.

An important object of the present invention is the provision of a seal of this type that accommodates itself to hydraulic pressure, as by the oil body, on one side or the other, as the case may be, in different installations, upon the diaphragm member of the seal, the latter having a peripheral portion that is arranged to slide on an axial wall of the cartridge shell to accommodate changes in such pressure while being resiliently urged in a direction to effect a fluid tight seal in any axial position of the diaphragm, the fluid pressure in either case contributing to the sliding sealing contact of the diaphragm periphery with the shell wall.

A further important object of the present invention is the combination with the structure just described of an interior frusto-conical surface provided by the opposite or interior wall of the shell, whereby, as a garter spring urges the diaphragm outwardly of the shell and is moved in a direction inwardly of the shell the garter spring expands in diameter toward the periphery of the diaphragm, thus contributing to the support of the diaphragm periphery in the more compressed positions of the device.

Other objects and advantages will be apparent, and the invention will be more fully understood, by reference to the following description, taken together with the accompanying drawings, of illustrative embodiments of the invention, and in which drawings—

FIGURE 1 is a face view of the seal of the present invention;

FIGURE 2 is a diametrical section taken on the line 2—2 of FIG. 1;

FIGURE 3 is an enlarged quarter section showing the device with its parts in the position shown in FIG. 2;

FIGURE 4 is another quarter section taken on the line 4—4 of FIG. 1, enlarged, but showing the parts in a partially compressed position of the device, a rotary shaft and housing element being included;

FIGURE 5 is another somewhat similar view but showing the seal device compressed solid;

FIGURE 6 is a segmental face view of the diaphragm member;

FIGURE 7 is a section taken on the line 7—7 of FIG. 6; and

FIGURE 8 shows an alternative form of the diaphragm;

Referring in detail to the illustrative constructions shown in the drawings and turning first to FIGS. 1 to 7 inclusive, the cartridge shell 11, generally metallic, is of annular cup or channel formation having the exterior wall 12, interior wall 13 and radial wall 14, the latter forming the inner end of the channel. Exterior wall 12 is outwardly flanged as at 15 for a purpose later pointed out.

Entered into the channel 16 so provided, from its outer end, is the annular sealing washer 17 of a suitable material, such as, for example, bakelite impregnated with a low friction substance such as graphite, and having a smooth lapped end face 18, the portion of the washer immediately adjacent this face being advantageously reduced in cross-section to form the sealing nose 19 at the outer margin of the washer and a counterbore 20 at its inner margin.

The bore 21 of the washer is indicated as having a plurality of internal ribs 22, in this instance three such ribs, which register with three similarly located indentations 23 in the internal face of the axial extension 24 of the interior wall 13 of the shell 14, the interlock so provided inhibiting relative rotation of the shell and washer but permitting relative axial movements thereof.

Interspersed with the interlock 22—23 just indicated is another interlock between the washer and shell here embodied in a plurality of tongues 25 struck outwardly from the shell extension 24, and, after the washer is entered into the shell, bent further outwardly to engage similarly circumferentially spaced shoulders 26 on the inner periphery of the washer, the shoulders 26 being provided by notches 27.

Thus, the shell and washer are held together against accidental separation while at the same time the washer is permitted to move inwardly of the shell. The two interlocks just referred to 22—23 and 25—26, are conveniently uniformly distributed about the inner periphery of the washer and shell, alternately, and providing a preloading interlock.

In accordance with the present invention, secured to the rear end of the washer 17 is an annular sealing diaphragm 28 formed of a liquid impervious pliant material such as synthetic rubber, or other suitable elastomer substance, that may be molded or otherwise formed to the shape shown. The material known as "Teflon" is also suitable. The diaphragm 28 in this example is of resilient molded synthetic rubber and in this instance desirably has a hub portion 29 of annular toroidal contour that enters an annular groove 30 in the rear face of the washer 17 and may be conveniently glued or bonded thereto. Rearwardly of the hub portion 29, the diaphragm is of outwardly flaring frusto-conical shape as at 32 terminating in an outwardly directed annular lip 33 that has a flat outer surface 34. The latter bears against the inner face 12a of the exterior wall 12 of the shell by a tight but slidable sealing contact. Entry of the diaphragm 28 into the shell with this tight fit is facilitated by the radius 35 on the shell at the juncture between its exterior wall 12 and its flange 15.

As shown in my said abandoned prior application, the interior wall 13 of the shell 14 is frusto-conical to provide an annular conoidal surface 36 within the shell, sloping downwardly from its inner to its outer end, and on which contactually plays a garter spring 37. The garter spring 37 is placed on the interior wall 13, as described in said abandoned prior application, so as to initially be slightly expanded about the cylindrical axial extension 24 of the shell inner wall. Thus, when the diaphragm and washer are entered into the shell and the washer locked therein by the tongue and shoulder connection 25—26, the garter spring 17 is moved upwardly on the conoidal surface 36 of the shell and thereby further expanded, giving this spring a bias which tends to contract it and move it outwardly of the shell to effect an outwardly moving force on the diaphragm and washer. Preferably this force is exerted through the intermediation of a ferrule ring 38 interposed between the garter spring and the diaphragm and received against an annular shoulder 39 in the diaphragm.

The inner periphery of the washer 17 is shown chamfered as at 40 to accommodate movement of the washer inwardly of the shell without interference by the conoidal surface 36 of the latter.

FIGURES 2 and 3 show the device in what may be referred to as the maximum working height, reference being thereby made to the maximum outward position of the diaphragm and washer with respect to the shell limited by the tongue and shoulder interlock 25—26. When now the seal device is installed as shown for example in FIG. 4, the washer and diaphragm are moved further inwardly of the shell and so that the sealing face 18 on the nose of the washer is in rotative sealing engagement with a radial face 41 on an enlargement 42 of a rotary shaft 43. A housing part 44 for the shaft has a bore 45 that receives the shell of the device with a tight sealing fit at 46, the peripheral flange 15 of the shell limiting entry of the shell into the bore 45 and also providing a reaction member for the spring 37. FIG. 4 shows what may be termed the mean working height of the device, where the garter spring 37 has been moved upwardly on the conoidal surface 36 and is therefore under tension.

The mean working height just referred to is somewhat greater than what may be termed the solid height of the device shown in FIG. 5, where the diaphragm has been moved inwardly to the limit so that its lip 34 contacts the radial wall 14 at the rear of the shell. This further potential compression of the device is provided to accommodate possible longitudinal variations in the position of the shaft 43 with respect to its housing element 44. Conversely, as wear occurs, in use, on the washer nose lapped face 18, the potential contractive energy of the spring 37, which tends to move it outwardly or downwardly on the conoidal surface 36 presses the diaphragm and washer outwardly of the shell and maintains the close sealing contact of the washer nose with the rotating shoulder 41 on the shaft.

In the movements of the diaphragm and washer just referred to, the diaphragm of course maintains a tight sealing engagement annularly with the inner face of the exterior wall 12 of the shell, by sliding contact therewith. In order to enhance the sealing engagement of the diaphragm periphery with the shell, the lip 33 of the diaphragm, as the diaphragm is molded, say, is slightly tilted, as best shown in FIG. 7, so that when the diaphragm is pressed into the shell this lip straightens out to a radial position and the contacting surface 34 on the lip is fully availed of.

As so constructed and arranged, the spring desirably expands, on the conoidal surface, as the diaphragm moves inwardly and as pressure on the diaphragm increases, the spring thereby being brought nearer to the peripheral edge of the diaphragm and contributing its physical propinquity to aid in supporting the periphery of the diaphragm in such exigency.

Turning now to the embodiment shown in FIG. 8, here the diaphragm 47 is given a somewhat different cross-sectional contour. As seen by the drawing, the peripheral portion of the diaphragm 47 has a return bend 48 therein that directs this portion 49 somewhat outwardly of the shell so that the peripheral lip 50 of the diaphragm 47 is somewhat radially aligned with the hub portion 51 of the diaphragm, for a purpose later pointed out.

In the installation of FIG. 4, for example, there may be a fluid body which is desired to be sealed, between the shaft 4 and its housing element 44. The fluid of this body would be prevented from escape by the seal at 46 between the shell and the housing element 44 and the seal at 18 between the washer nose and the shaft shoulder 41, but the fluid would not be sealed from entrance into the interior of the shell to the side of the diaphragm against which the garter spring 37 presses, thereby creating a hydraulic pressure on the diaphragm in a direction for example as indicated by the arrow 52 (FIG. 4). If, in some installations, it is desired to seal a fluid against entrance to the space between the shaft 43 and its housing element 44, as represented in FIG. 8, here the fluid pressure would be upon the diaphragm on its side opposite to the garter spring 37 and the fluid would therefore create a hydraulic pressure in the direction of the arrow 53 (FIG. 8). In each case, the shape of the diaphragm is illustrated to be such as to make use of the hydraulic pressure just referred to to enhance the seal at the washer lip 33, in the case of FIG. 4, or 50, in the case of FIG. 8. That is to say, the fluid hydraulic pressure is brought to play on the hollow side of the diaphragm, this hollow side in FIG. 4 being at 54 and in FIG. 8 being at 55.

As seen in FIG. 8, a second, additional, garter spring 56 may be employed along with the garter spring 37, thereby enhancing the spring force where that is required or desirable.

The present construction affords an improvement over prior seal devices, including, in some aspects that of my own prior abandoned applications, in that, for one thing, the radial dimension and even the axial length of the seal device may be substantially curtailed so as to cause it to accommodate itself to minimized distances between the relatively rotatable elements, as, in this instance say, between the shaft shoulder 41 and the housing element 44. By such accommodation the versatility and usefullness of the device is enhanced.

"Teflon" is a trade-mark of Du Pont Co. for a polytetrafluoro-ethylene polymer.

The invention having been described, it is to be understood that such changes may be made as fall within the scope of the appended claims without departing therefrom.

What is here claimed is:

1. A fluid seal comprising an annular channel-shaped retainer having a substantially cylindrically extending exterior wall and a frusto-conical interior wall forming an annular channel between said exterior wall and said interior wall, a sealing washer mounted concentric with respect to said annular channel for axial movement toward and away from said annular channel, an annular diaphragm member having a hub portion fixed to said sealing washer and an outwardly directed annular lip bearing against said exterior wall forming a slidable fit therewith, a garter spring mounted on said frusto-conical interior wall in such manner that said garter spring is free to roll over a substantial portion of said frusto-conical interior wall, a ferrule ring positioned intermediate said garter spring and said hub portion, said garter spring, said hub portion, said sealing washer and said ferrule ring being arranged such that said garter spring exerts an angularly directed force parallel to said frusto-conical wall on said ferrule ring and said ferrule ring translates said angularly directed force to an axially directed force and transmits said axially directed force to said sealing washer by way of said hub portion.

2. A fluid seal comprising an annular channel-shaped retainer having a substantially cylindrically extending exterior wall and a frusto-conical interior wall forming an annular channel between said exterior wall and said interior wall, a sealing washer mounted concentric with respect to said annular channel for axial movement toward and away from said annular channel, an annular diaphragm member having a hub portion fixed to said sealing washer and an outwardly directed annular lip terminating in a flat outer surface with said flat surface bearing against said exterior wall in a tight slidable sealing contact therewith, a garter spring mounted on said frusto-conical interior wall in such manner that said garter spring is free to roll over a substantial portion of said frusto-conical interior wall, a ferrule ring positioned intermediate said garter spring and said hub portion, said garter spring, said hub portion, said sealing washer and said ferrule ring being arranged such that said garter spring exerts an angularly directed force parallel to said frusto-conical wall on said ferrule ring and said ferrule ring translates said angularly directed force to an axially directed force and transmits said axially directed force to said sealing washer by way of said hub portion, and means to transmit torque from said frusto-conical interior wall to said sealing washer.

3. A fluid seal comprising an annular channel-shaped retainer having a substantially cylindrically extending exterior wall and a frusto-conical interior wall forming an annular channel between said exterior wall and said interior wall, a sealing washer mounted concentric with respect to said annular channel for axial movement toward and away from said annular channel, a resilient annular diaphragm member having a hub portion fixed to said sealing washer and an outwardly directed annular lip terminating in flat outer surface with said surface urged against said exterior wall by the resiliency of said resilient annular diaphragm to form a slidable sealing contact therewith, a garter spring mounted on said frusto-conical interior wall in such manner that said garter spring is free to roll over a substantial portion of said frusto-conical interior wall, a ferrule ring positioned intermediate said garter spring and said hub portion, said garter spring, said hub portion, said sealing washer and said ferrule ring being arranged such that said garter spring exerts an angularly directed force parallel to said frusto-conical wall on said ferrule ring and said ferrule ring translates said angularly directed force to an axially directed force and transmits said axially directed force to said sealing washer by way of said hub portion, means to transmit torque from said frusto-conical interior wall to said sealing washer, and means to limit the axial travel of said frusto-conical interior wall with respect to said sealing washer.

References Cited in the file of this patent

UNITED STATES PATENTS

| | | |
|---|---|---|
| 2,462,067 | Buckendale | Feb. 22, 1949 |
| 2,486,088 | Yaros | Oct. 25, 1949 |
| 2,871,039 | Payne | Jan. 27, 1959 |
| 2,889,183 | Peras | June 2, 1959 |